US009171371B2

(12) United States Patent
Sung et al.

(10) Patent No.: US 9,171,371 B2
(45) Date of Patent: Oct. 27, 2015

(54) DISPLAY SYSTEM AND METHOD USING HYBRID USER TRACKING SENSOR (75) Inventors: Gee Young Sung, Daegu (KR); Dong Kyung Nam, Yongin-si (KR); Yun Tae Kim, Hwaseong-si (KR); Ju Yong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 13/067,600

(22) Filed: Jun. 13, 2011

(65) Prior Publication Data

US 2012/0038627 A1   Feb. 16, 2012

(30) Foreign Application Priority Data

Aug. 12, 2010   (KR) ........................ 10-2010-0077749

(51) Int. Cl.
H04N 5/225 (2006.01)
H04N 5/222 (2006.01)
G06K 9/00 (2006.01)
G09G 5/00 (2006.01)
G06T 7/00 (2006.01)

(52) U.S. Cl.
CPC ..... *G06T 7/0042* (2013.01); *G06T 2207/10012* (2013.01); *G06T 2207/30201* (2013.01)

(58) Field of Classification Search
CPC .......... G06K 9/00228; G06K 9/00241; G06K 9/00221; G06K 9/00288; G06K 9/00248; H04N 5/23219; H04N 13/0239; H04N 21/44218
USPC ............... 345/633, 659, 619; 348/222.1, 158, 348/148, 77, 333.01–333.13; 382/103; 455/556.1

See application file for complete search history.

(56) References Cited

U.S. PATENT DOCUMENTS

| | | | |
|---|---|---|---|
| 8,120,625 B2* | 2/2012 | Hinckley | 345/659 |
| 2004/0105010 A1* | 6/2004 | Osen | 348/211.7 |
| 2004/0228505 A1* | 11/2004 | Sugimoto | 382/118 |
| 2005/0225723 A1* | 10/2005 | Pilu | 351/209 |
| 2005/0232467 A1* | 10/2005 | Mohri et al. | 382/103 |
| 2006/0074289 A1* | 4/2006 | Adler et al. | 600/407 |
| 2008/0219517 A1* | 9/2008 | Blonk et al. | 382/118 |
| 2008/0267459 A1* | 10/2008 | Nakada et al. | 382/118 |
| 2009/0244275 A1* | 10/2009 | Masuda | 348/78 |
| 2010/0026714 A1* | 2/2010 | Utagawa | 345/633 |
| 2010/0029327 A1* | 2/2010 | Jee | 455/556.1 |
| 2010/0066667 A1* | 3/2010 | MacDougall et al. | 345/156 |
| 2010/0066763 A1* | 3/2010 | MacDougall et al. | 345/656 |
| 2010/0099457 A1* | 4/2010 | Kim | 455/556.1 |
| 2010/0124941 A1* | 5/2010 | Cho | 455/556.1 |
| 2010/0125816 A1* | 5/2010 | Bezos | 715/863 |
| 2010/0208107 A1* | 8/2010 | Nonaka et al. | 348/240.99 |
| 2010/0220204 A1* | 9/2010 | Fruehauf et al. | 348/222.1 |

(Continued)

FOREIGN PATENT DOCUMENTS

| | | |
|---|---|---|
| JP | 08-287291 | 11/1996 |
| JP | 09-084000 | 3/1997 |

(Continued)

*Primary Examiner* — Chia-Wei A Chen
(74) *Attorney, Agent, or Firm* — NSIP Law (57) ABSTRACT Example embodiments of a display system and method using a hybrid user tracking sensor are described. The display system may determine a final location of a user based on information of a face or eyes of a user generated based on information received from a plurality of cameras and posture information generated based on information received from a plurality of sensors.

26 Claims, 7 Drawing Sheets

(56) References Cited

U.S. PATENT DOCUMENTS

| | | | |
|---|---|---|---|
| 2010/0253766 A1* | 10/2010 | Mann et al. | 348/51 |
| 2010/0271469 A1* | 10/2010 | She | 348/77 |
| 2010/0277575 A1* | 11/2010 | Ismael et al. | 348/53 |
| 2010/0295958 A1* | 11/2010 | Larsson et al. | 348/222.1 |
| 2011/0037866 A1* | 2/2011 | Iwamoto | 348/222.1 |
| 2011/0050916 A1* | 3/2011 | Otsuka | 348/208.2 |
| 2011/0119611 A1* | 5/2011 | Ahn et al. | 715/769 |
| 2011/0135207 A1* | 6/2011 | Flynn et al. | 382/209 |
| 2011/0141114 A1* | 6/2011 | Chen et al. | 345/428 |
| 2011/0164141 A1* | 7/2011 | Tico et al. | 348/207.99 |
| 2011/0169865 A1* | 7/2011 | Hagiwara | 345/659 |
| 2011/0228180 A1* | 9/2011 | Lo | 349/15 |
| 2011/0248987 A1* | 10/2011 | Mitchell | 345/419 |
| 2011/0273369 A1* | 11/2011 | Imai et al. | 345/158 |
| 2012/0019557 A1* | 1/2012 | Aronsson et al. | 345/633 |
| 2012/0169596 A1* | 7/2012 | Zhuang | 345/158 |

FOREIGN PATENT DOCUMENTS

| | | |
|---|---|---|
| KR | 10-0677569 | 1/2007 |
| WO | 96-18925 | 6/1996 |

\* cited by examiner

DISPLAY SYSTEM AND METHOD USING HYBRID USER TRACKING SENSOR

CROSS-REFERENCE TO RELATED APPLICATIONS

This application claims the priority benefit of Korean Patent Application No. 10-2010-0077749, filed on Aug. 12, 2010, in the Korean Intellectual Property Office, the disclosure of which is incorporated herein by reference.

BACKGROUND

1. Field

Example embodiments of the present disclosure relate to a display system and method using a hybrid user tracking sensor.

2. Description of the Related Art

To effectively configure a three dimensional (3D) image to provide a feeling of space to a person, an image having viewpoints that are perceived differently by a left eye and a right eye of the person may be expressed. To configure the 3D image without using a filter such as glasses, a spatial division of the 3D image depending on a viewpoint may be required to express the 3D image, and such a scheme may be referred to as an autostereoscopic display scheme. In an autostereoscopic display, an image may be spatially divided to be expressed using an optical tool, and typically, an optical lens or an optical barrier may be used. In a case of the lens, a lenticular lens may be used to express each pixel image in a particular direction. In a case of the barrier, a slit may be configured in front of a display so that only a particular pixel may be viewed in a particular direction. In a case of the autostereoscopic display using the lens or the barrier, an image basically having two viewpoints, that is, a left viewpoint and a right viewpoint may be expressed. In this case, a relatively narrow sweet spot may be formed. The sweet spot may be expressed by a viewing distance and a viewing angle. The viewing distance may be determined based on a pitch of the lens or the slit, and the viewing angle may be determined based on a number of the expressed viewpoints. A display in which the number of the viewpoints is increased to widen the viewing angle may be referred to as an autostereoscopic multiview display.

In a case of a multiview 3D display using the lenticular lens or a variable parallax barrier, a 3D viewing area may be constrained since each viewpoint image may converge to an optimal view distance at regular intervals to form the each viewpoint image. The 3D image with no distortion may be viewed at a constrained angle and a particular distance. When a user tilts his or her face or lies on his or her side while watching the 3D image, a proper 3D image may not be viewed.

In the present disclosure, a display system and method for providing the image more effectively are disclosed.

SUMMARY

The foregoing and/or other aspects are achieved by providing a display system including a location information provider unit to provide location information of a face or eyes of a user generated based on information received from a plurality of cameras, a posture information provider unit to provide posture information generated based on information received from a plurality of sensors, and a final location determining unit to determine a final location of the user based on at least one of the location information and the posture information.

The plurality of sensors may include an acceleration sensor and a terrestrial magnetism sensor. The posture information provider unit may include a posture angle calculator to calculate a posture angle with respect to the direction of gravity based on information received from the acceleration sensor, an azimuth angle calculator to calculate an azimuth angle based on information received from the terrestrial magnetism sensor, and a provider to provide posture information including at least the posture angle and the azimuth angle. The posture angle may include a pitch and a roll, and the azimuth angle may include a yaw.

The plurality of cameras may include a stereo camera including two cameras. The location information provider unit may include a location information generator to generate the location information corresponding to three dimensional (3D) location information of the user, using a stereo image received from the stereo camera.

The final location determining unit may include a posture change determining unit to determine whether the posture of the display system has changed based on the posture information, and a determining unit to determine the final location based on whether the posture has changed.

The determining unit may include a first determining unit to determine a location based on the location information as the final location when the posture remains unchanged, a relative location calculator to calculate a relative location with respect to the user based on the posture information when the posture has changed, and a second determining unit to determine the final location based on the relative location. The second determining unit may search for a location of the face or the eyes of the user in an image within a predetermined range determined according to the relative location, among images received from the plurality of cameras, and determine the found location as the final location.

The display system may further include a display unit to generate a multiview image based on the final location. The display unit may change and display the multiview image based on the final location through a subpixel rendering using a lenticular lens. The display unit may change and display the multiview image based on the final location through a subpixel rendering using a cycle and a width of a variable parallax barrier, and the variable parallax barrier.

The foregoing and/or other aspects are achieved by providing a display method including providing location information of a face or eyes of a user generated based on information received from a plurality of cameras, providing posture information generated based on information received from a plurality of sensors, and determining a final location of the user based on at least one of the location information and the posture information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
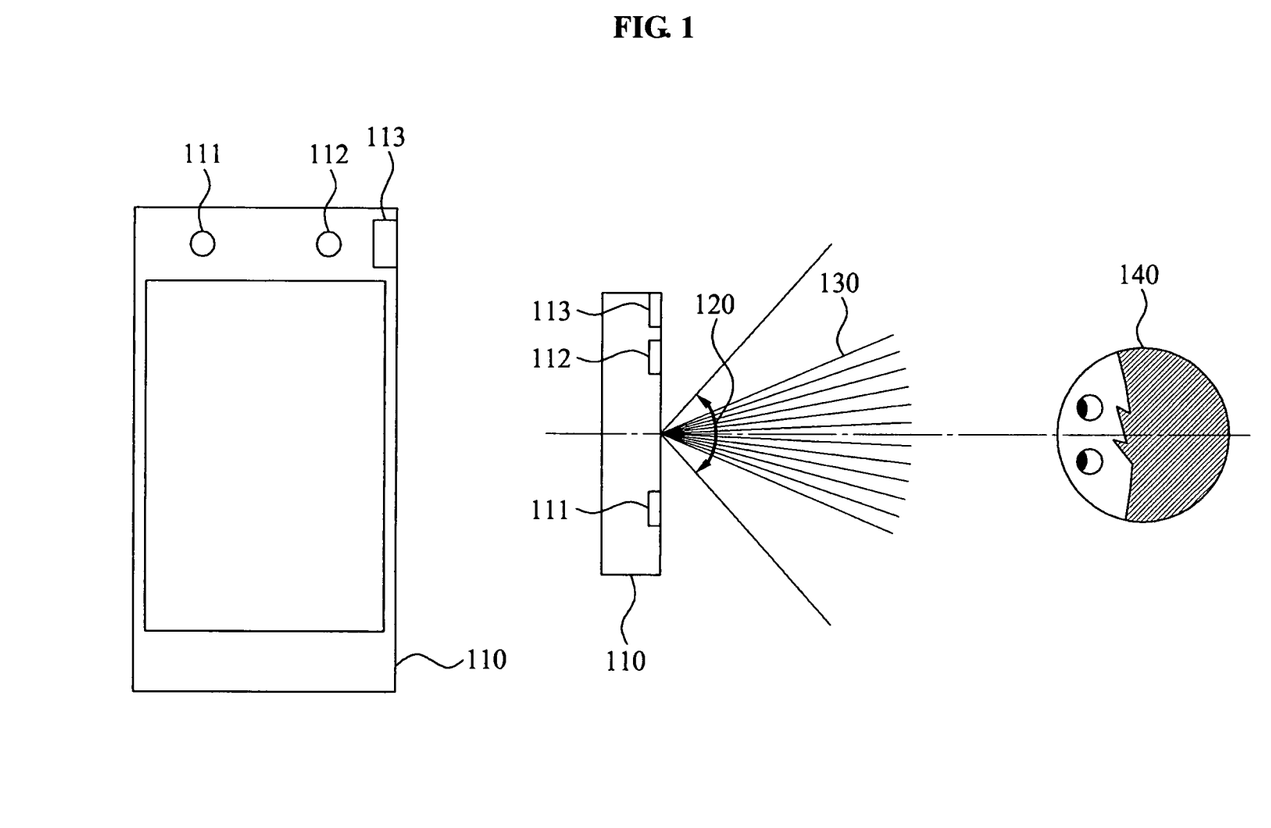
FIG. 1 illustrates an overall display system according to example embodiments.

FIG. 1 illustrates an overall display system 110 according to example embodiments. The display system 110 may include, for example, stereo cameras 111 and 112, and a sensor 113 that may acquire posture information that changes through movement of the display system 110. In this instance, the display system 110 may accurately trace a location of a user 140 at a high speed by combining information received from the sensor 113 and the stereo cameras 111 and 112. Here, the sensor 113 may include an acceleration sensor and a terrestrial magnetism sensor. In an alternative embodiment the sensor 113 may include the acceleration sensor, the terrestrial magnetism sensor, and a gyro sensor. Other configurations are equally available.

Since information about a three dimensional (3D) location of a face and eyes, and in an embodiment, pupils, of the user 140 may be obtained through the stereo cameras 111 and 112, and 3D information about the movement of the display system 110 may be obtained through the sensor 113, the display system 110 may obtain an accurate relative location of the user 140 with respect to the display system 110. When the display system 110 moves, while a movement of the user 140 using an image input through the stereo cameras 111 and 112 is traced, a direction in which the user 140 has relatively moved may be unverifiable. Thus, the entire image obtained through the camera may need to be searched to acquire a desired location. The desired location may include the location of the face, eyes, pupils, and the like. When the sensor 113 is employed in combination with the stereo cameras 111 and 112, a relative location of the user 140 with respect to the display system 110 may be calculated using posture information sensed through the sensor 113. Accordingly, an error and searching time may be reduced compared with the case in which the entire image is searched.

Referring to FIG. 1, a range 120 may indicate a field of view (FOV), and a straight line 130 may indicate one of multiple viewpoints provided by the display system 110. The multiple viewpoints may be generated by a lenticular lens or a variable parallax barrier. For example, the lenticular lens may be adhered to a front of a flat panel display (FPD), and pixel information configured on the FPD according to a characteristic of the lenticular lens may diverge, due to the lenticular lens, in a particular direction determined for each location to generate a multiview image. In a case of configuring a two-viewpoint stereoscopic image, column pixel information below each lenticular lens may proceed in different directions by the lenticular lens. When the user 140 is at a given viewing location, left column pixel information below the lenticular lens may proceed in a direction to a right eye of the user 140, and right column pixel information below the lenticular lens may proceed in a direction to a left eye of the user 140. The user 140 may experience a feeling of space by viewing an image having viewpoints that are perceived differently by a right and left eye of the user 140. When the user 140 is away from the given location, a current location of the user 140 may be controlled to be an optimal viewing location by generating a viewpoint image using the location of the face, eyes, and the like of the user 140 as described above.

Figure 2:
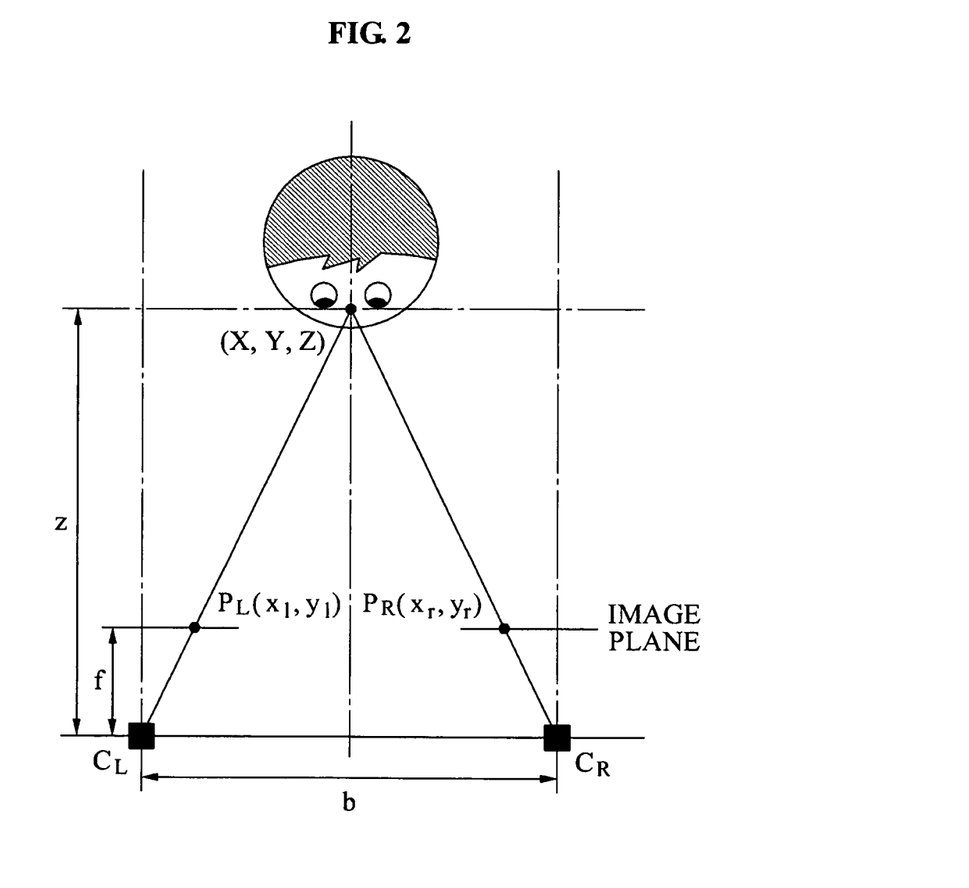
FIG. 2 illustrates a stereo camera and a user of the display system of FIG. 1.

FIG. 2 illustrates a stereo camera and a user of the display system of FIG. 1. First, symbols used with reference to FIG. 2 are described. '$C_L$' may indicate a left camera of the stereo cameras, and '$C_R$' may indicate a right camera of the stereo cameras. '(X, Y, Z)' may indicate a coordinate of a point of a face or an eye of a user to be measured in a predetermined 3D coordinate system. In the 3D coordinate system of FIG. 2, it is assumed that a horizontal direction indicates an x-axis, a vertical direction indicates a y-axis, and a direction perpendicular to an image plane indicates z-axis on the image plane faced by the user.

'$P_L(x_1, y_1)$' may indicate a point at which a virtual line connecting a point indicating a location of the left camera and a point to be measured intersect with a virtual line based on the image plane, and '$P_R(x_1, y_1)$' may indicate a point at which a virtual line connecting a point indicating a location of the right camera and a point to be measured intersect with the virtual line based on the image plane. 'b' may indicate a distance between the point indicating the location of the left camera and the point indicating the location of the right camera, and 'z' may indicate a distance from a virtual line connecting the point indicating the location of the left camera and the point indicating the location of the right camera to the point to be measured. 'f' may indicate a distance from the virtual line connecting the point indicating the location of the left camera and the point indicating the location of the right camera to the virtual line based on the image plane.

In this instance, the 'X', corresponding to a coordinate value of the x-axis of the point to be measured, may be obtained based on Equation 1, or may be obtained based on Equation 2 using trigonometry.

$$f:Z = x_l:X \longrightarrow X = \frac{x_l Z}{f} \quad \text{[Equation 1]}$$

$$f:Z = x_r:(X - b) \longrightarrow X = \frac{bf + x_r Z}{f} \quad \text{[Equation 2]}$$

The 'Y', corresponding to a coordinate value of the y-axis of the point to be measured, may be obtained based on Equation 3, or may be obtained based on Equation 4 using trigonometry.

$$f:Z = y_l:Y \longrightarrow Y = \frac{y_l Z}{f} \quad \text{[Equation 3]}$$

$$f:Z = y_r:(Y - b) \longrightarrow Y = \frac{bf + y_r Z}{f} \quad \text{[Equation 4]}$$

In this instance, the 'Z', corresponding to a coordinate value of the z-axis of the point to be measured, may be obtained based on Equation 5 using Equation 1 and Equation 2.

$$Z = \frac{bf}{x_l - x_r} = \frac{bf}{d} \qquad \text{[Equation 5]}$$

Figure 3:
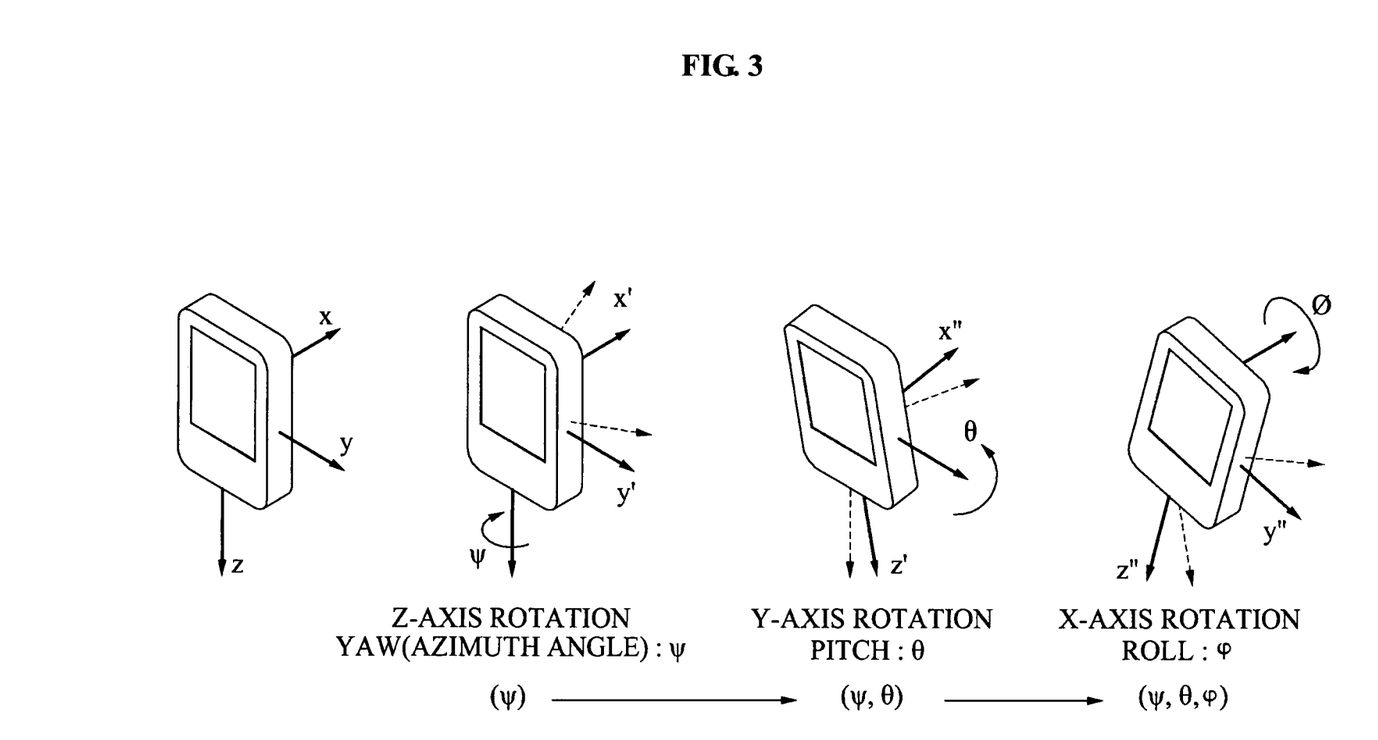
FIG. 3 illustrates an example for describing posture information of a display system according to example embodiments.

FIG. 3 illustrates an example of describing posture information of a display system according to example embodiments. FIG. 3 illustrates each of a yaw, a pitch, and a roll each measured according to a z-axis rotation, a y-axis rotation, and an x-axis rotation in a virtual 3D coordinate system with respect to the display system. In this instance, the pitch and the roll may be calculated using an angle tilted with respect to the direction of gravity using an acceleration sensor. The yaw may be calculated using a terrestrial magnetism sensor. The terrestrial magnetism sensor is a sensor with which a northerly direction may be measured, and the yaw, corresponding to an azimuth angle component, may be calculated using the terrestrial magnetism sensor.

A gyro sensor may detect a rotating speed in a direction of an axis. However, the gyro sensor may detect the rotating speed, also referred to as angular velocity in a direction of an arbitrary axis without information about a reference coordinate. Thus, a posture of the display system may not be measured, and a rotating speed within a short period of time may be measured and thus, reliable information is difficult to be obtained since an error is accumulated during use over a long period of time. Accordingly, the posture information with respect to the display system may be obtained by calculating each of the yaw, the pitch, and the roll using the acceleration sensor and the terrestrial magnetism sensor. The gyro sensor may be additionally used to obtain more accurate posture information as needed.

Figure 4:
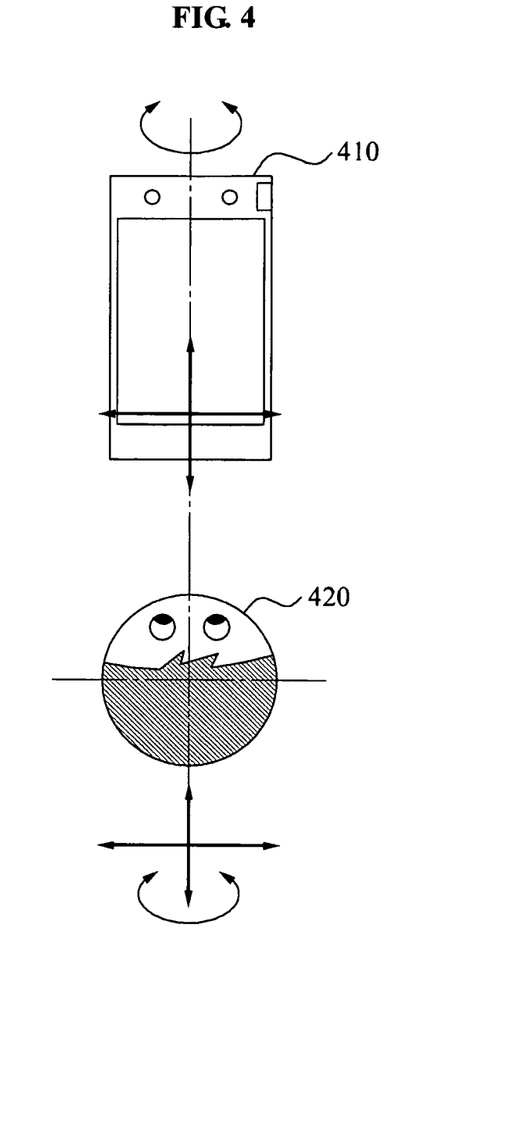
FIG. 4 illustrates a display system and a user according to example embodiments.

FIG. 4 illustrates a display system 410 and a user 420 according to example embodiments. Referring to FIG. 4, the display system 410 and the user 420 may move individually and independently. While the user 420 views a 3D image using a portable device such as the display system 410, a viewpoint image input to the eyes of the user 420 may change due to a movement of the user 420 or a movement of the display system 410 or a movement of both the display system 410 and the user 420. The viewpoint images may converge at a point in a space to form each parallax image. When the user 420 views from a location that is not an optimal viewing location, the user 420 may view a deformed image and a picture quality may deteriorate due to a substantial amount of crosstalk. Thus, eye fatigue may occur, for example.

Accordingly, the display system 410 according to example embodiments may obtain information about a location of a face, eyes, or pupils, of the user 420 using a plurality of cameras. When a movement occurs in the display system 410, the display system 410 may measure a relatively accurate location of the user 420 by feeding back posture information that may be obtained through a plurality of sensors. By generating the viewpoint image based on a location of the user 420 and a movement of the display system 410, the display system 410 may provide a natural 3D image regardless of the movement of the user 420 and the movement of the display system 410.

Figure 5:
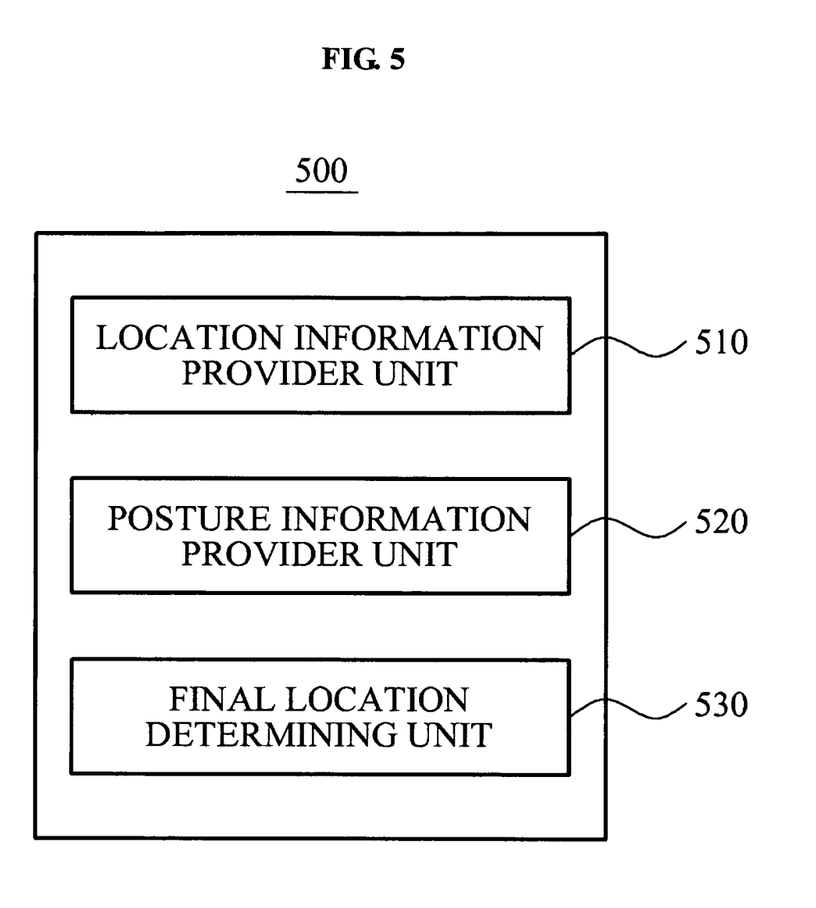
FIG. 5 illustrates an internal configuration of a display system according to example embodiments.

FIG. 5 illustrates an internal configuration of a display system 500 according to example embodiments. The display system 500 according to example embodiments may include, for example, a location information provider unit 510, a posture information provider unit 520, and a final location determining unit 530.

The location information provider unit 510 may provide location information of a face or eyes of a user generated based on information received from a plurality of cameras. For example, the plurality of cameras may include a stereo camera including two cameras. In this instance, the location information provider unit 510 may include a location information generator (not shown) to generate the location information corresponding to 3D location information of the user, using a stereo image received from the stereo camera. For example, the location information generator may generate the location information using the stereo camera using the method described with reference to FIG. 2.

The posture information provider unit 520 may provide posture information generated based on information received from a plurality of sensors. The plurality of sensors may include an acceleration sensor and a terrestrial magnetism sensor. In this instance, the posture information provider unit 520 may include a posture angle calculator (not shown) to calculate a posture angle leaned to with respect to the direction of gravity based on information received from the acceleration sensor, an azimuth angle calculator (not shown) to calculate an azimuth angle based on information received from the terrestrial magnetism sensor, and a provider (not shown) to provide posture information including at least the posture angle and the azimuth angle. Here, the posture angle may include a pitch and a roll, and the azimuth angle may include a yaw.

The final location determining unit 530 may determine a final location of the user based on at least one of the location information and the posture information. In this instance, the final location determining unit 530 may include a posture change determining unit to determine whether the posture of the display system has changed based on the posture information and a determining unit (not shown) to determine the final location based on whether the posture has changed. Also, to determine the final location based on whether the posture has changed, the determining unit may include a first determining unit (not shown) to determine a location based on the location information as the final location when the posture remains unchanged, a relative location calculator (not shown) to calculate a relative location with respect to the user based on the posture information when the posture has changed, and a second determining unit (not shown) to determine the final location based on the relative location. When the posture of the display system 500 remains unchanged, the display system 500 may determine the final location of the user, eyes of the user, or pupils of the user, based on the location information. When the posture of the display system 500 changes, the display system 500 may calculate the relative location with respect to the user based on the posture information, and determine the final location based on the relative location. To perform the operations, the second determining unit may search for a location of the face or the eyes of the user in an image within a predetermined range determined based on the relative location, among images received from the plurality of cameras, and determine the found location as the final location. Accordingly, the location of the user may be accurately measured at a high speed using the acceleration sensor and the terrestrial magnetism sensor that are relatively inexpensive, compared with a gyro sensor, and also using the stereo camera.

The display system 500 may further include a display unit (not shown) to generate a multiview image based on the final location. As an example, the display unit may change and display the multiview image based on the final location through a subpixel rendering using a lenticular lens. As another example, the display unit may change and display the multiview image based on the final location through a subpixel rendering using a cycle and a width of a variable parallax barrier, and the variable parallax barrier. In a case where the display system 500 provides the multiview image to provide a 3D image such as a multiview 3D display device, an optimal 3D image may be continuously provided regardless of a location at which the user views the 3D image by generating and displaying the multiview image based on the aforementioned final location. The optimal 3D image may be provided even when the device moves.

Figure 6:
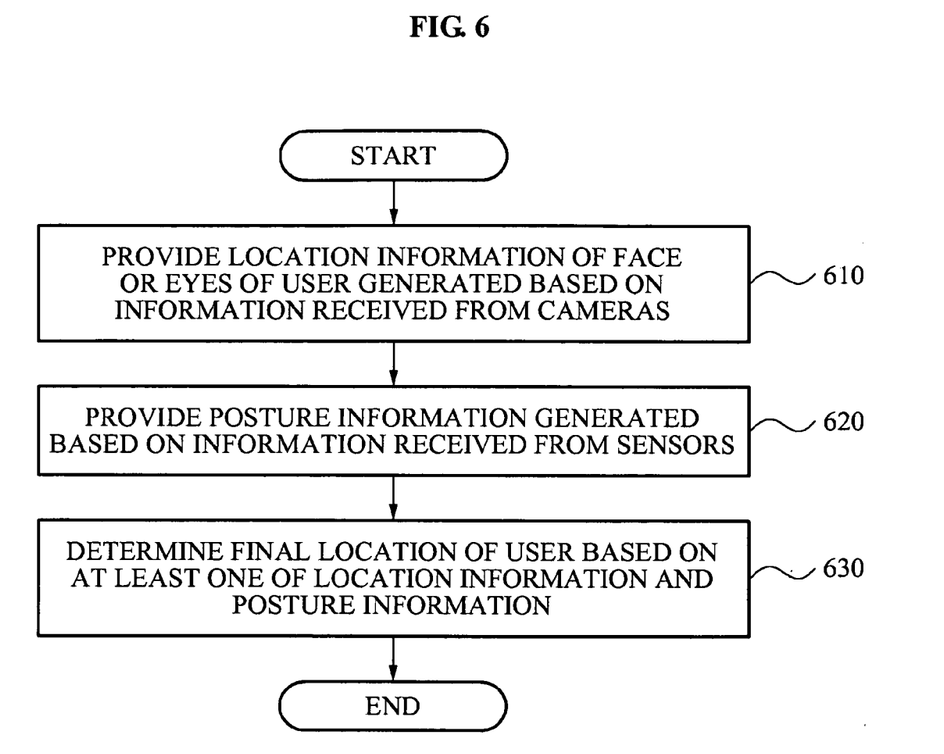
FIG. 6 illustrates a display method according to example embodiments.

FIG. 6 illustrates a display method according to example embodiments. The display method may be performed, for example, by the display system 500 described with reference to FIG. 5. In FIG. 6, operations performed by the display system 500 are described to describe the display method.

In operation 610, the display system 500 may provide location information of a face or eyes of a user generated based on information received from a plurality of cameras. For example, the plurality of cameras may include a stereo camera including two cameras. In this instance, the display system 500 may generate the location information corresponding to 3D location information using a stereo image received from the stereo camera. For example, the display system 500 may generate the location information using the stereo camera using a scheme described with reference to FIG. 2.

In operation 620, the display system 500 may provide posture information generated based on information received from a plurality of sensors. In this instance, the plurality of sensors may include an acceleration sensor and a terrestrial magnetism sensor. In this case, the display system 500 may calculate a posture angle with respect to the direction of gravity based on information received from the acceleration sensor, and calculate an azimuth angle based on information received from the terrestrial magnetism sensor. The display system 500 may provide posture information including at least the posture angle and the azimuth angle. Here, the posture angle may include a pitch and a roll, and the azimuth angle may include a yaw.

In operation 630, the display system 500 may determine a final location of the user based on at least one of the location information and the posture information. In this instance, the display system 500 may determine whether the posture of the display system has changed based on the posture information, and determine the final location based on whether the posture has changed. To determine the final location based on whether the posture has changed, the display system 500 may determine a location based on the location information as the final location when the posture remains unchanged. In a case where the posture has changed, the display system 500 may calculate a relative location with respect to the user based on the posture information, and determine the final location based on the relative location. When the posture of the display system 500 remains unchanged, the display system 500 may determine the final location of the user, the eyes of the user, or pupils of the eyes, using the location information. When the posture of the display system 500 has changed, the display system 500 may calculate the relative location with respect to the user based on the posture information, and determine the final location based on the relative location. Here, the display system 500 may search for a location of the face or the eyes of the user in an image within a predetermined range determined according to the relative location, among images received from the plurality of cameras, and determine the found location as the final location. Accordingly, the location of the user may be accurately measured at a high speed using the acceleration sensor and the terrestrial magnetism sensor that are relatively inexpensive, as compared with a gyro sensor, and also using the stereo camera.

The display system 500 may further include generating a multiview image based on the final location (not shown). As an example, the display system 500 may change and display the multiview image according to the final location through a subpixel rendering using a lenticular lens. As another example, the display system 500 may change and display the multiview image according to the final location through a subpixel rendering using a cycle and a width of a variable parallax barrier, and the variable parallax barrier. In a case where the display system 500 provides the multiview image to provide a 3D image such as a multiview 3D display device, an optimal 3D image may be continuously provided regardless of a location at which the user views the 3D image by generating and displaying the multiview image based on the aforementioned final location. The optimal 3D image may be provided even when the device moves.

Figure 7:
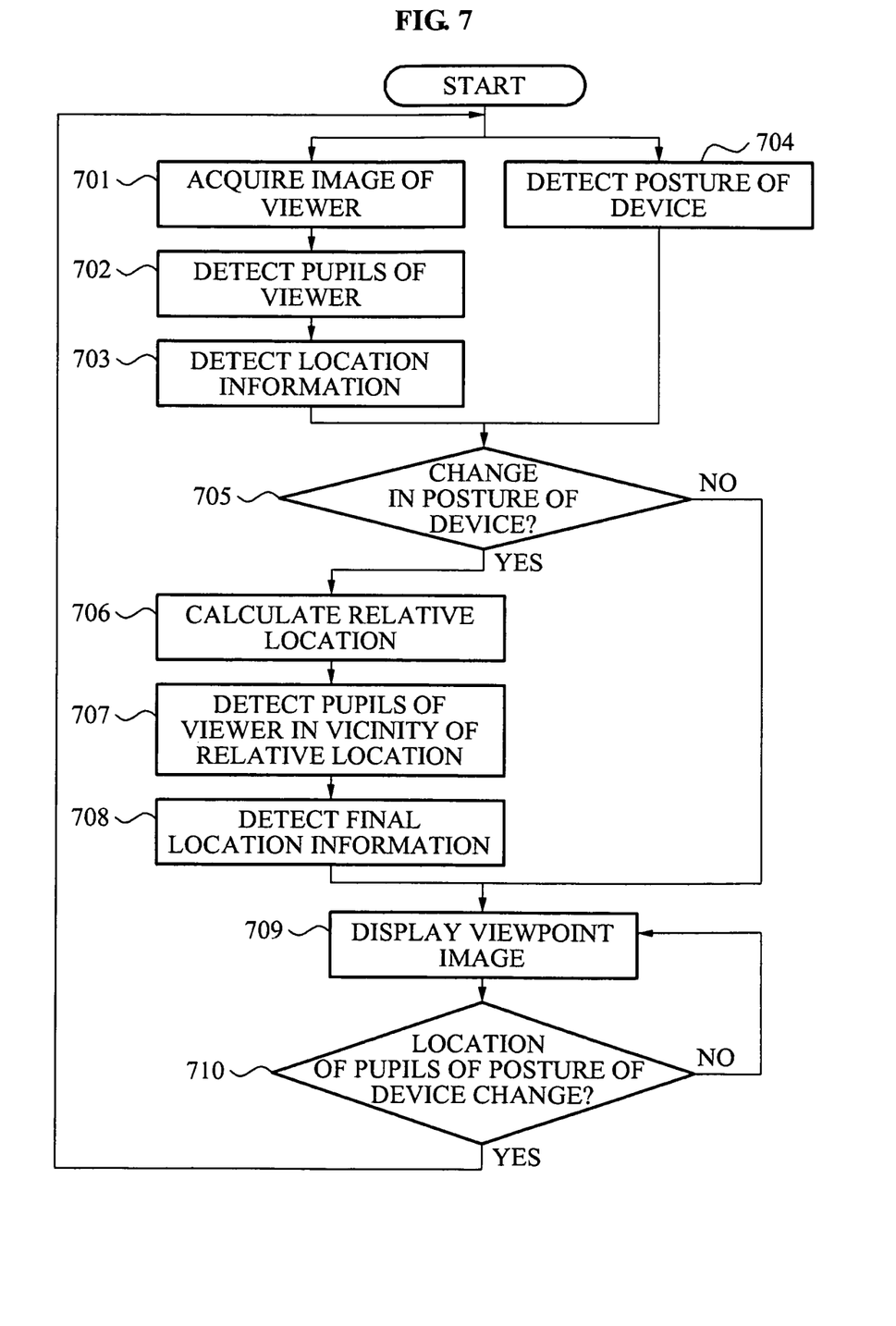
FIG. 7 illustrates a method of determining a final location to display a viewpoint image.

FIG. 7 illustrates a method of determining a final location to display a viewpoint image. The method according to an embodiment of FIG. 7 may be performed by a portable device to which embodiments are applied. The portable device may correspond to the display system 500 described with reference to FIG. 5.

In operation 701, the portable device may acquire an image of a viewer. When a 3D image is started to be viewed, the portable device may receive an input of the image of the viewer taken by a stereo camera.

The portable device may detect pupils of the viewer in operation 702, and may detect location information in operation 703. More specifically, the portable device may detect the pupils of the viewer in the input image, and may detect the location information based on a location of the pupils.

In operation 704, the portable device may detect a posture of the portable device. Operation 704 may be performed after operation 701 through operation 703 are performed, or may be performed in parallel with operation 701 through operation 703. In operation 704, the portable device may detect the posture of the portable device using a plurality of sensors such as an acceleration sensor and a terrestrial magnetism sensor.

When the posture of the portable device is determined to have changed in operation 705, operation 706 may be performed. When the posture of the portable device is determined to remain unchanged in operation 705, operation 709 may be performed. In this instance, whether the posture has changed may be determined based on posture information detected in operation 704.

In operation 706, the portable device may calculate a relative location. In operation 707, the portable device may detect the pupils of the viewer in the vicinity of the relative location. In operation 708, the portable device may detect final location information. Here, the relative location may correspond to a relative location of a user with respect to the portable device. The portable device may attempt to detect the pupils of the user within an area in the vicinity of the relative location on the image input through the stereo camera, using the relative location with respect to the user calculated through the posture information. When the location of the pupils is traced on the entire image, a large amount of calculations may be needed, and a recognition rate may be relatively low. However, when the pupils are detected within the area in the vicinity of the relative location as described above, a recognition error and the amount of calculation may be reduced to save system resources and decrease the detecting time.

In operation 709, the portable device may display a viewpoint image. When the posture of the portable device is determined to have changed in operation 705, the viewpoint image may be generated and displayed according to the final location information detected in operation 708. When the posture of the portable device is determined to remain unchanged in operation 705, the viewpoint image may be generated and displayed using, as the final location, the location information detected in operation 703.

In operation 710, the portable device may iteratively verify whether the location of the pupils or the posture of the portable device has changed during predetermined intervals, for example, during every predetermined period of time. When the location of the pupils and the posture of the portable device remains unchanged, operation 709 may be performed. When the location of the pupils or the posture of the portable device has changed, at least one of operation 701 and operation 704 may be performed again. When the location of the pupils has changed, operation 701 may be performed. When the posture of the portable device has changed, operation 704 may be performed. When both of the location of the pupils and the posture of the portable device have changed, both of operation 701 and operation 704 may be performed.

As described above, according to embodiments, a location of a user may be more accurately measured using a plurality of cameras and a plurality of sensors, and the measured location of the user may be used for displaying an image. When a multiview 3D image is displayed in a portable device, a natural 3D image may be provided using a location of pupils of the user measured reflecting a posture of the portable device as well as the location of the pupils of the user.

A display method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media or processor-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The described hardware devices may be configured to act as one or more software modules in order to perform the operations of the above-described embodiments, or vice versa. The display method may be executed on a general purpose computer or processor or may be executed on a particular machine such as the display system described herein. Any one or more of the software modules described herein may be executed by a dedicated processor unique to that unit or by a processor common to one or more of the modules.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A display system comprising:
a processor to control one or more processor-executable units;
a location information provider unit to provide location information of a face or eyes of a user generated based on information received from a plurality of cameras;
a posture information provider unit to provide posture information of the display system generated based on information received from a plurality of sensors; and
a final location determining unit to determine a final location of the user with respect to the display system based on the location information of the face or the eyes of the user and the posture information of the display system,
wherein the final location determining unit searches for a location of the face or the eyes of the user within a predetermined range within an image from the plurality of cameras,
wherein the predetermined range is determined based on X and Y coordinates of the user on the image with respect to the display system,
wherein each sensor type differs among the plurality of sensors, and
wherein the final location determining unit comprises:
a relative location calculator to calculate the X and Y coordinates based on the posture information in response to a posture of the display system being changed.

2. The display system of claim 1, wherein:
the plurality of sensors comprises:
an acceleration sensor and a terrestrial magnetism sensor, and
the posture information provider unit comprises:
a posture angle calculator to calculate a posture angle with respect to the direction of gravity based on information received from the acceleration sensor;
an azimuth angle calculator to calculate an azimuth angle based on information received from the terrestrial magnetism sensor; and
a provider to provide posture information comprising at least the posture angle and the azimuth angle.

3. The display system of claim 2, wherein:
the posture angle comprises a pitch and a roll, and
the azimuth angle comprises a yaw.

4. The display system of claim 1, wherein:
the plurality of cameras comprises:
a stereo camera comprising two cameras, and
the location information provider unit comprises:
a location information generator to generate the location information corresponding to three dimensional (3D) location information of the user, using a stereo image received from the stereo camera.

5. The display system of claim 1, wherein the final location determining unit comprises:
a posture change determining unit to determine whether the posture of the display system has changed based on the posture information; and
a determining unit to determine the final location based on whether the posture has changed.

6. The display system of claim 5, wherein the determining unit comprises:
a first determining unit to determine a location based on the location information as the final location when the posture remains unchanged; and
a second determining unit to determine the final location based on the X and Y coordinates when the posture has changed.

7. The display system of claim 6, wherein the second determining unit searches for the location of the face or the eyes of the user in an image within the predetermined range determined according to the X and Y coordinates, among images received from the plurality of cameras, and determines the found location as the final location.

8. The display system of claim 1, further comprising:

a display unit to generate a multiview image based on the final location.

9. The display system of claim 8, wherein the display unit changes and displays the multiview image based on the final location through a subpixel rendering using a lenticular lens.

10. The display system of claim 8, wherein the display unit changes and displays the multiview image based on the final location through a subpixel rendering using a cycle and a width of a variable parallax barrier, and the variable parallax barrier.

11. A display method comprising:
providing location information of a face or eyes of a user generated based on information received from a plurality of cameras;
providing posture information of a display apparatus generated based on information received from a plurality of sensors; and
determining, by way of a processor, a final location of the user with respect to the display system based on the location information of the face or the eyes of the user and the posture information of the display apparatus,
wherein the determining the final location comprises searching for a location of the face or the eyes of the user within a predetermined range within an image from the plurality of cameras,
wherein the predetermined range is determined based on X and Y coordinates of the user on the image with respect to the display apparatus,
wherein each sensor type differs among the plurality of sensors, and
wherein the determining comprises:
calculating the X and Y coordinates based on the posture information in response to a posture of the display system being changed.

12. The display method of claim 11, wherein:
the plurality of sensors comprises:
an acceleration sensor and a terrestrial magnetism sensor, and
the providing posture information comprises:
calculating a posture angle with respect to the direction of gravity based on information received from the acceleration sensor;
calculating an azimuth angle based on information received from the terrestrial magnetism sensor; and
providing posture information comprising at least the posture angle and the azimuth angle.

13. The display method of claim 11, wherein:
the plurality of cameras comprises:
a stereo camera comprising two cameras, and
the providing location information comprises:
generating the location information corresponding to three dimensional (3D) location information of the user, using a stereo image received from the stereo camera.

14. The display method of claim 11, wherein the determining comprises:
determining whether the posture of the display system has changed based on the posture information; and
determining the final location based on whether the posture changed.

15. The display method of claim 14, wherein the determining comprises:
determining a location based on the location information as the final location when the posture remains unchanged; and
determining the final location based on the X and Y coordinates when the posture has changed.

16. The display method of claim 15, wherein the determining the final location based on the X and Y coordinates comprises searching for the location of the face or the eyes of the user in an image within the predetermined range determined according to the X and Y coordinates, among images received from the plurality of cameras, and determining the found location as the final location.

17. The display method of claim 11, further comprising:
generating a multiview image based on the final location.

18. A non-transitory computer-readable medium comprising a program for instructing a computer to perform the method of claim 11.

19. A display apparatus comprising:
a processor to control one or more processor-executable units;
a location information provider unit to obtain information about a location of at least one eye of a user;
a posture information provider unit to sense a posture of the display apparatus based on one or more sensors; and
a final location determining unit to determine a final location of the user with respect to the display apparatus based on the location information provided by the location information provider and the posture information of the display apparatus provided by the posture information provider,
wherein the final location determining unit searches for a location of the face or the eyes of the user within a predetermined range within an image from the plurality of cameras,
wherein the predetermined range is determined based on a relative location of the user on the image with respect to the display apparatus,
wherein each sensor type differs among the one or more sensors, and
wherein the final location determining unit comprises:
a relative location calculator to calculate X and Y coordinates based on the posture information in response to a posture of the display system being changed.

20. The display apparatus of claim 19, further comprising:
a display adjustment unit to adjust a display of the display apparatus according to the final location information determined by the final location determining unit.

21. The display apparatus of claim 20, wherein the adjusting of the display by the display adjustment unit comprises adjusting a multiview image based on the final location information using a subpixel rendering.

22. The display apparatus of claim 19, wherein the posture information provider unit comprises one or more of an acceleration sensor and a terrestrial magnetism sensor.

23. The display apparatus of claim 19, wherein the location information provider unit comprises a stereo camera to obtain the information about the location of the at least one eye of the user.

24. A display method of a display apparatus, the method comprising:
sensing information about a location of at least one eye of a user;
sensing a posture of the display apparatus based on one or more sensors; and
determining, by way of a processor, a final location of the at least one eye of the user based on the location information of the at least one eye of the user and the posture information of the display apparatus,
wherein the determining the final location comprises searching for a location of the face or the eyes of the user within a predetermined range within an image from the plurality of cameras, wherein the predetermined range is determined based on a relative location of the user on the image with respect to the display apparatus, wherein each sensor type differs among the one or more sensors, and wherein the determining comprises:
   calculating X and Y coordinates based on the posture information in response to a posture of the display system being changed.

25. The display method of claim 24, further comprising adjusting a display of the display apparatus according to the final location information.

26. A non-transitory computer-readable medium comprising a program for instructing a computer to perform the method of claim 24.

* * * * *